(12) United States Patent
Jakobsson et al.

(10) Patent No.: US 8,307,407 B2
(45) Date of Patent: Nov. 6, 2012

(54) SELECTABLE CAPTCHAS

(75) Inventors: Bjorn Markus Jakobsson, Palo Alto, CA (US); Philippe J. P. Golle, San Francisco, CA (US); Richard Chow, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 938 days.

(21) Appl. No.: 12/045,917

(22) Filed: Mar. 11, 2008

(65) Prior Publication Data

US 2009/0235327 A1    Sep. 17, 2009

(51) Int. Cl.
*G06F 7/04* (2006.01)
*G06F 17/30* (2006.01)

(52) U.S. Cl. .............. 726/2; 726/7; 726/17; 713/170; 713/182

(58) Field of Classification Search .................. 726/2
See application file for complete search history.

(56) References Cited

U.S. PATENT DOCUMENTS

| | | | |
|---|---|---|---|
| 7,197,646 B2 | 3/2007 | Fritz et al. | |
| 2004/0199597 A1* | 10/2004 | Libbey et al. | 709/207 |
| 2008/0109896 A1* | 5/2008 | Millar | 726/19 |
| 2009/0037986 A1* | 2/2009 | Baker | 726/5 |
| 2010/0031330 A1* | 2/2010 | Von Ahn et al. | 726/5 |

* cited by examiner

*Primary Examiner* — Shewaye Gelagay

(74) *Attorney, Agent, or Firm* — Shun Yao; Park, Vaughan, Fleming & Dowler LLP

(57) ABSTRACT

A system for displaying a set of selectable CAPTCHAs produces a first set of CAPTCHAs whose images are based at least partially on an alphanumeric sequence, where a respective CAPTCHA in the first set is associated with a CAPTCHA property. The system also produces a second set of CAPTCHAs whose images are based at least partially on an alphanumeric sequence, where a respective CAPTCHA in the second set is not associated with a CAPTCHA property. Next, the system displays the first and second sets of CAPTCHAs. Finally, the system makes respective CAPTCHAs in the first and second sets of CAPTCHAs selectable, thereby allowing a user to pass a CAPTCHA challenge by distinguishing the first set of CAPTCHAs from the second set of CAPTCHAs without typing the words associated with the images.

21 Claims, 5 Drawing Sheets

SELECTABLE CAPTCHAS

BACKGROUND

1. Field

The present disclosure relates generally to "Completely Automated Public Turing test to tell Computers and Humans Apart" (hereinafter "CAPTCHA"). More specifically, the present disclosure relates to a technique for making CAPTCHAs selectable.

2. Related Art

A CAPTCHA is a test that is easy for a human to pass, but difficult for a machine to pass. For example, a CAPTCHA might involve typing a word that is presented in a visually noisy way such as by distorting the word, placing it on a textured background, and overlaying it with randomly placed line segments of varying thickness. Machines have long been able to recognize words, but such visual noise makes this recognition task difficult for machines. In contrast, most humans do not have difficulty recognizing words, despite visual noise.

CAPTCHAs are useful in many online applications. For example, CAPTCHAs can help prevent computer-automated robots ("bots") from taking online polls, creating new email accounts, and causing fraudulent advertising clicks. Bot programs can produce e-mail accounts that are difficult to trace, making them ideal vehicles for proliferating spam. Bots can also infiltrate chat rooms; collecting personal information and posting links to promotional sites; generate worms; break password systems; invade privacy; and generally drain resources.

To defend e-commerce systems from bots, an increasing number of companies are securing their sites with CAPTCHAs. For example, users registering on Yahoo must first correctly recognize a distorted word displayed against a cluttered background and then type the word in order to prove they are human.

Advances in automated techniques for solving CAPTCHAs have led to the creation of CAPTCHAs that are harder for bots to solve. Current CAPTCHAs have become sufficiently difficult for humans to solve that many service providers now balk at deploying them for fear of deterring potential clients. This has made CAPTCHAs somewhat annoying, time-consuming, and difficult to use, particularly on devices with a limited user interface.

One way to reduce the annoyance and difficulty of use of a CAPTCHA is to present images of objects and let the user select those images that have certain properties. For example, ASIRRA, a CAPTCHA system developed by Microsoft, uses a CAPTCHA challenge involving identifying all the cats in a sequence of twelve images of both cats and dogs. Note that ASIRRA is based on images of pets rather than on an alphanumeric sequence. This is an important distinction because recent evidence suggests that a machine might be able to easily discriminate between images of dogs and images of cats. In contrast, passing a CAPTCHA challenge based on an alphanumeric sequence has been shown to be difficult for a machine. This is because an alphanumeric sequence can be distorted and made noisy in such a way that a person with a required skill can pass the CAPTCHA challenge, but a machine cannot. In contrast, distorting an image of a dog or a cat might simply make it unrecognizable for both humans and machines.

For example, passing a CAPTCHA challenge on a mobile device is more cumbersome and time-consuming than with a traditional keyboard. Therefore, a test to distinguish humans from computers that can be solved more easily on a mobile device would be far less distracting and more acceptable to most users.

SUMMARY

One embodiment of the present invention provides a system for displaying a set of selectable CAPTCHAs. During operation, the system produces a first set of CAPTCHAs whose images are based at least partially on an alphanumeric sequence, wherein a respective CAPTCHA in the first set is associated with a CAPTCHA property. A CAPTCHA property is any property that is associated with the alphanumeric sequence on which the CAPTCHA image is based. The system also produces a second set of CAPTCHAs whose images are based at least partially on an alphanumeric sequence, wherein a respective CAPTCHA in the second set is not associated with the CAPTCHA property. Next, the system displays the first and second sets of CAPTCHAs. The CAPTCHAs from the first and second set of CAPTCHAs can be displayed in a random order to prevent a machine from recognizing a certain display pattern. For example, if the first set of CAPTCHAs are always displayed first, then the machine could easily pass the CAPTCHA challenge by always selecting the first half of all displayed CAPTCHAs. Finally, the system makes respective CAPTCHAs in the first and second sets of displayed CAPTCHAs selectable, thereby allowing a user to pass a CAPTCHA challenge by distinguishing the first set of CAPTCHAs from the second set of CAPTCHAs without typing the words associated with the images.

In a variation of this embodiment, producing the first set of CAPTCHAs involves identifying the CAPTCHA property, identifying a set of CAPTCHAs associated with the CAPTCHA property, and returning the set of identified CAPTCHAs.

In a variation of this embodiment, the CAPTCHA property includes properties associated with the alphanumeric sequence on which the CAPTCHA is based.

In a variation of this embodiment, the number of CAPTCHAs produced in the first set and the number of CAPTCHAs produced in the second set are based on one or more of: desired CAPTCHA strength, probability of a machine recognizing a CAPTCHA, and display characteristics.

In a variation of this embodiment, displaying the first and second sets of CAPTCHAs involves displaying respective CAPTCHAs in the first and second sets of CAPTCHAs in a matrix or displaying respective CAPTCHAs in the first and second sets of CAPTCHAs in a sequence.

In a variation of this embodiment, displaying the first and second sets of CAPTCHAs involves playing an audio version of respective CAPTCHAs in the first and second set of CAPTCHAs in a sequence.

In a variation of this embodiment, making respective CAPTCHAs in the first and second sets of displayed CAPTCHAs selectable involves allowing a respective CAPTCHA to be selected by one or more of: keyboard, mouse, pen, graphics tablet, scroll wheel, trackball, joystick, pointing stick, touchpad, button, dataglove, footmouse, touch screen, key pad, dial, switch, gesture, facial expression, eye tracking, body movement, brain interface, voice command, and other signaling.

DETAILED DESCRIPTION

The following description is presented to enable any user skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Overview

CAPTCHAs can be created with multiple methods. For example, a CAPTCHA can be created from an at least partially alphanumeric sequence by distorting the sequence, placing it on a grid background, and overlaying it with random line segments. The result is a CAPTCHA whose image is based at least partially on an alphanumeric sequence.

A CAPTCHA can have one or more properties associated with it. In general, a CAPTCHA property is any property that is associated with the alphanumeric sequence on which the CAPTCHA image is based. For example, a CAPTCHA can have the property "English" associated with it, meaning that the alphanumeric sequence on which the CAPTCHA is based represents an English word. Or a CAPTCHA can have the property "contains a letter 'e'" associated with it.

A CAPTCHA can also have a more complex property associated with it. For example, a CAPTCHA can have the property "contains an 'e' after a 'c'" associated with it or "contains two adverbs."

Such properties allow a user to pass a CAPTCHA challenge by distinguishing a first set of CAPTCHAs (i.e., those having the property) from a second set of CAPTCHAs (i.e., those not having the property) through selection. That is, a property can enable a set of CAPTCHAs to be made selectable. In this disclosure, a "set" of CAPTCHAs can include one or more CAPTCHAs.

Figure 1:
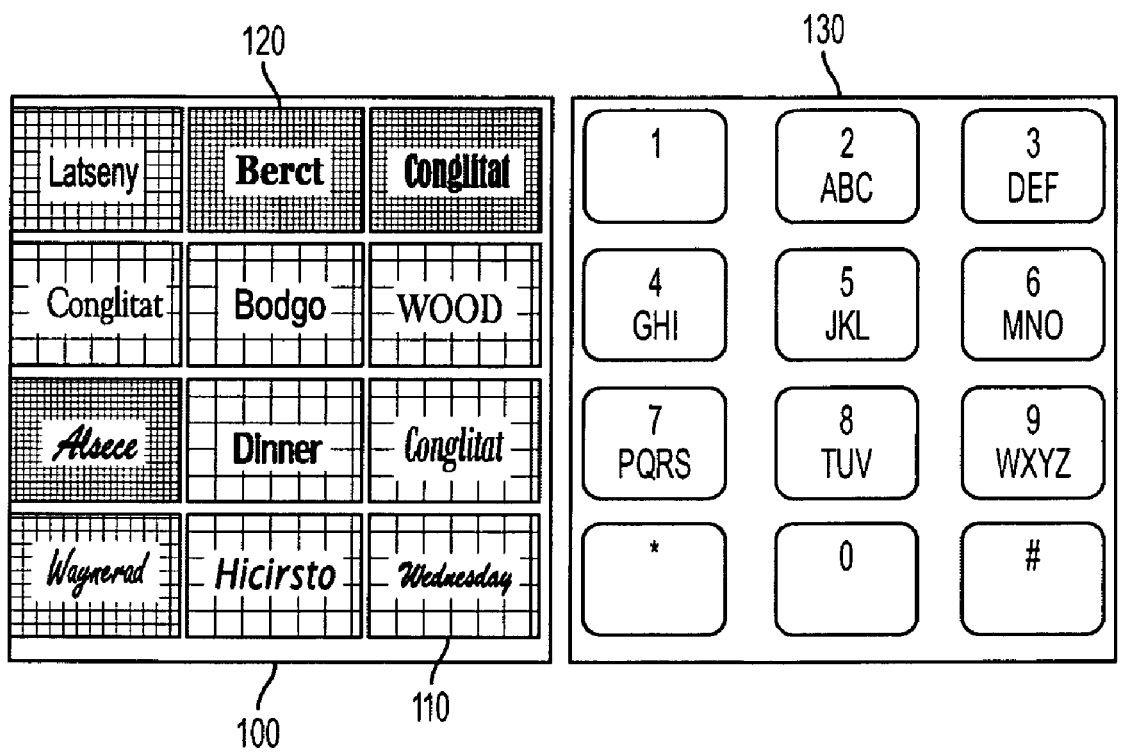
FIG. 1 illustrates a method of selecting CAPTCHAs in accordance with one embodiment of the present invention.

FIG. 1 illustrates a set of selectable CAPTCHAs in accordance with the present invention. The figure shows a set of CAPTCHAs displayed in a matrix 100 such that each CAPTCHA is selectable through various user-interface selection methods. The challenge in this CAPTCHA test is to distinguish between English alphanumeric sequences (i.e., those CAPTCHAs associated with the property "English") from non-English alphanumeric sequences through selection. For example, the alphanumeric sequence "Wednesday" (CAPTCHA 110) has the property "English" whereas the alphanumeric sequence "Berct" (CAPTCHA 120) does not have the property "English." Various other properties could be used to create a set of selectable CAPTCHAs in this example. For example, those alphanumeric sequences containing three vowels (the property) vs. those alphanumeric sequences not having three vowels.

In one embodiment, the system can challenge a user to select the CAPTCHAs with certain properties. In the example in FIG. 1, the system can request the user to select all the CAPTCHAs that contain an English alphanumeric sequence. In response, the user can select the correct CAPTCHAs by pressing the corresponding keys on a cell-phone keypad 130. This way, the user can pass the CAPTCHA challenge without typing anything.

An embodiment in accordance with this invention uses that CAPTCHA property to split a set of CAPTCHAs into two different sets: one set having the CAPTCHA property and the other set not. Once these two sets have been produced, they can be displayed and the CAPTCHAs in the two sets can be made selectable, thereby allowing a user to pass a CAPTCHA challenge by distinguishing the first set of CAPTCHAs from the second set of CAPTCHAs. Note that this CAPTCHA challenge does not involve typing the contents of a CAPTCHA.

FIG. 1 also illustrates a method of selecting CAPTCHAs in accordance with the present invention. The figure shows a keypad 130 for selecting corresponding CAPTCHAs. For example, to select the alphanumeric sequence "Dinner," the user would press the keypad numeral "8." If the CAPTCHA challenge is to select English alphanumeric sequences in the CAPTCHA matrix, the user could press the "6," "8," and "#" keys (in any order) to pass this CAPTCHA challenge. This example vividly demonstrates the ease with which a user can select CAPTCHAs: the user merely presses three keys (in any order) rather than typing alphanumeric sequences such as "Wood," "Dinner," or "Wednesday." On limited user-interface devices such as mobile phones, the difference between selectable CAPTCHAs and standard CAPTCHAs is even more striking since keyboard entry is much more cumbersome. Note that the user can use a variety of input or selection mechanisms to perform the selection. These methods include clicking a mouse, touching a touch screen, pressing a selection button, and giving a voice command (e.g. "yes" or "no") when a particular CAPTCHA is highlighted by the system.

Overall System Operation

Figure 2:
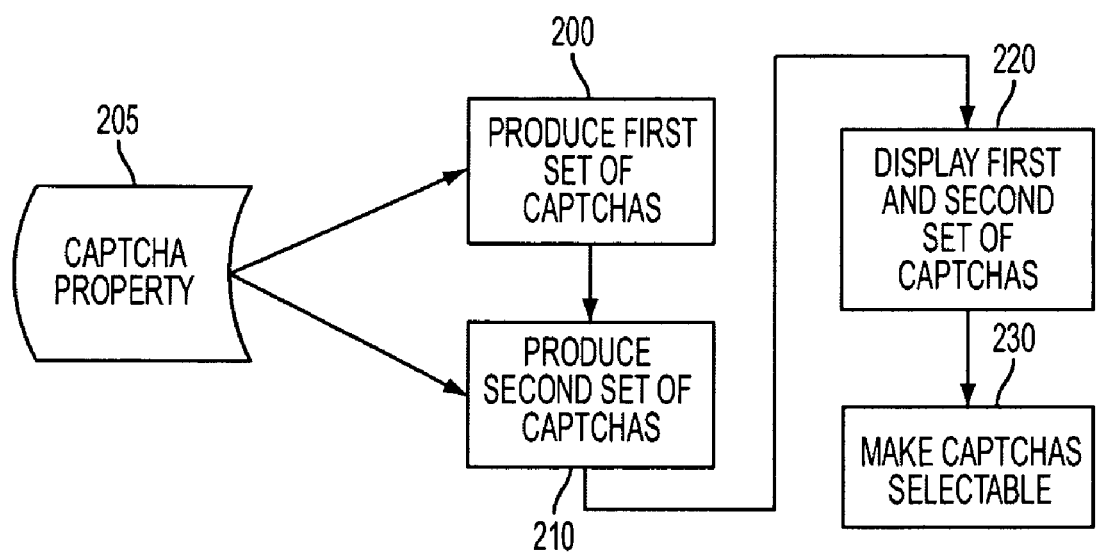
FIG. 2 presents a block diagram of an exemplary system for making a set of CAPTCHAs selectable in accordance with one embodiment of the present invention.

FIG. 2 presents a block diagram of an exemplary system for a set of CAPTCHAs selectable in accordance with one embodiment of the present invention.

Typically, the system produces a first set of CAPTCHAs (operation 200), given a CAPTCHA property 205. Each CAPTCHA in this first set is associated with a particular CAPTCHA property. The system also produces a second set of CAPTCHAs with respect to CAPTCHA property 205 (operation 210). Each CAPTCHA in this second set is not associated with CAPTCHA property 205. Note that operation 200 and 210 can be performed in parallel rather than in sequence and they are only shown in sequence in FIG. 2 for illustration.

Next, the system displays the first and second sets of CAPTCHAs in order (operation 220). The CAPTCHAs from the first and second set of CAPTCHAs can be displayed in a random order to prevent a machine from recognizing a certain display pattern. For example, if the first set of CAPTCHAs are always displayed first, then the machine could easily pass the CAPTCHA challenge by always selecting the first half of all displayed CAPTCHAs. Finally, the system makes respective CAPTCHAs in the first and second sets selectable. This allows a user to pass a CAPTCHA challenge without typing the contents of a CAPTCHA. As a result, the CAPTCHA challenge is made less annoying, less time-consuming, and less difficult to use. This result is particularly important on devices with a limited user interface such as a mobile device.

Note that the selectable CAPTCHAs can be displayed or processed over any network or on any computer system between a user and the target that the CAPTCHA is intended to protect.

Note also that a person with a required skill (e.g., English) is likely to pass a CAPTCHA test and a person without the required skill is not likely to pass the CAPTCHA test. Moreover, an automated tool is not likely to pass the CAPTCHA test.

Producing a Set of CAPTCHAs

Figure 3:
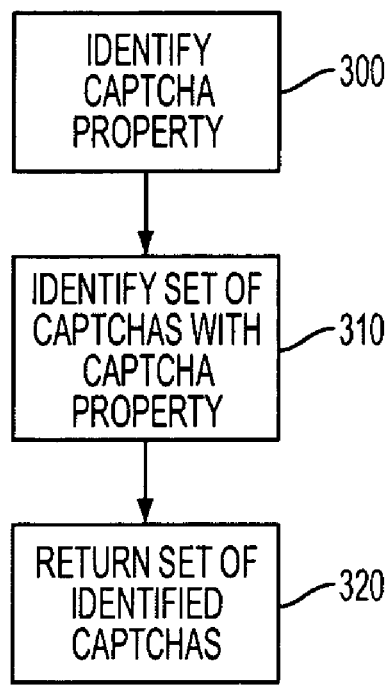
FIG. 3 presents a flowchart illustrating an exemplary process for producing a first set of CAPTCHAs in accordance with one embodiment of the present invention.

FIG. 3 presents a flowchart illustrating an exemplary process for producing a first set of CAPTCHAs in accordance with one embodiment of the present invention. First, the system identifies a CAPTCHA property (operation 300). For example, a CAPTCHA property can be a property of a alphanumeric sequence represented by a CAPTCHA (e.g., "English"). Next, the system identifies a set of CAPTCHAs associated with the CAPTCHA property (operation 310). In one embodiment, the set of CAPTCHAs associated with the CAPTCHA property can be identified from a database of CAPTCHAs with CAPTCHAs with the CAPTCHA property and CAPTCHAs without the property. Finally, the system returns the set of CAPTCHAs with the CAPTCHA property (operation 320). Note that operations 310 and 320 can also be performed to identify a set of CAPTCHAs that are not associated with the property. Thus, a process similar to the one shown in FIG. 3 could be used to produce the second set of CAPTCHAs (i.e., those not having the property).

CAPTCHA Properties

Figure 4:
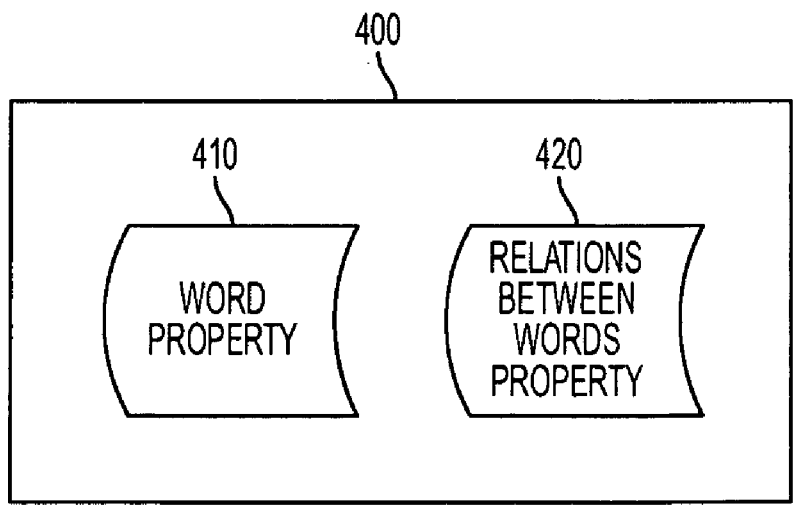
FIG. 4 illustrates an exemplary set of CAPTCHA properties in accordance with one embodiment of the present invention.

FIG. 4 illustrates an exemplary set of CAPTCHA properties data 400 in accordance with one embodiment of the present invention. CAPTCHA properties 400 can include alphanumeric sequence properties 410 associated with an alphanumeric sequence on which the CAPTCHA is based, such as "English" or "three vowels." CAPTCHA properties 400 can also include properties 420 associated with more complex properties such as "two consecutive adverbs in a sentence."

CAPTCHA Strength

Figure 5:
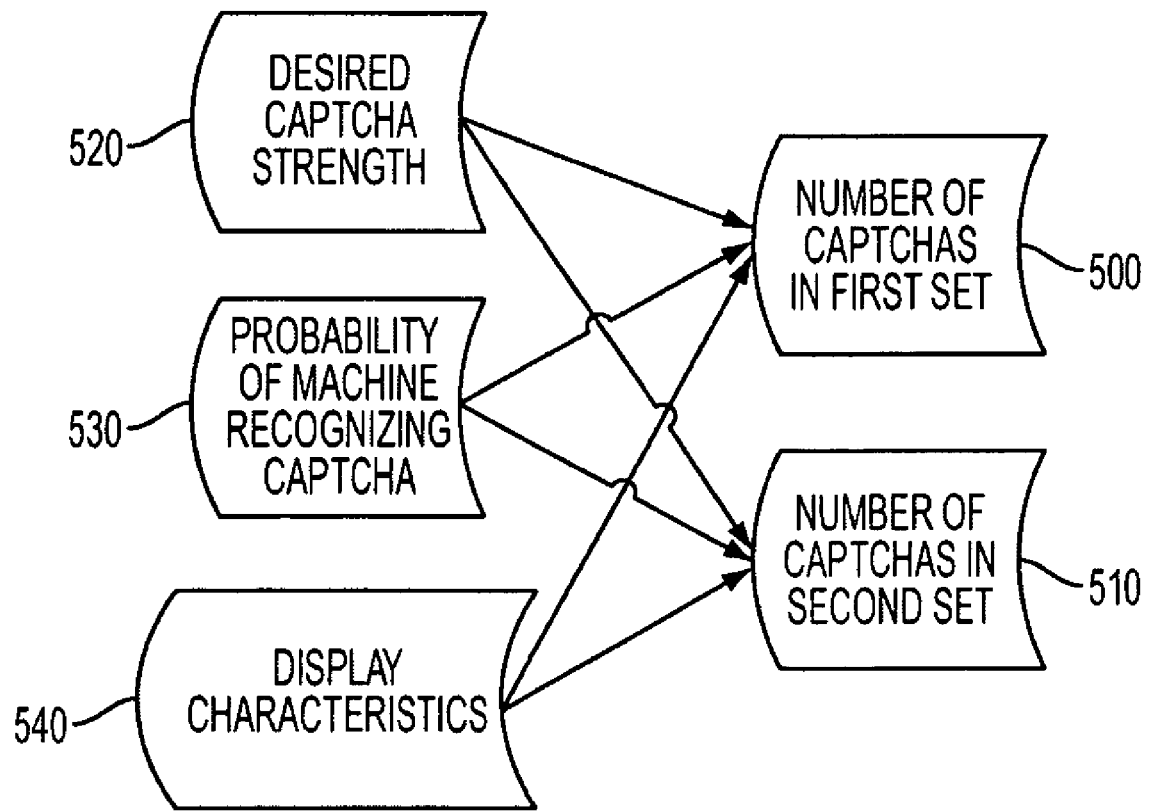
FIG. 5 presents a block diagram illustrating an exemplary process for producing selectable CAPTCHAs in accordance with one embodiment of the present invention.

FIG. 5 presents a block diagram illustrating an exemplary process for producing selectable CAPTCHAs in accordance with one embodiment of the present invention. The number of CAPTCHAs in the first and second sets, 500 and 510, can be used to control the difficulty of a CAPTCHA challenge. In one embodiment, the system determines the number of CAPTCHAs in the first and second sets, 500 and 510, based on desired CAPTCHA strength 520, a probability of a machine recognizing a CAPTCHA 530, and one or more display characteristics 540. For example, if the system implementer desires a selectable CAPTCHA set that is difficult for a machine to solve, the number of CAPTCHAs in the first and second sets can increase.

However, if the probability of a machine recognizing a CAPTCHA 530 is low, the number of CAPTCHAs in the first and second set can decrease. Similarly, display characteristics 540 can influence the number of CAPTCHAs in the first and second sets. For example, if the user's display can display a large number of CAPTCHAs either in parallel or sequentially, the number of CAPTCHAs in the first and second sets can also increase.

Various techniques can be used to specify the precise functional relationship between the desired CAPTCHA strength 520, the probability of a machine recognizing a CAPTCHA 530, the display characteristics 540, and the number of CAPTCHAs in the first and second sets, 500 and 510. For example, TABLE 1 presents one possible approach for calculating a probability of success for a selectable CAPTCHA. For concreteness and purposes of illustration only, consider the problem of selecting three CAPTCHAs that are English alphanumeric sequences from a 3×4 matrix of selectable CAPTCHAs.

Let p be the probability of a machine recognizing a CAPTCHA, say, as an English alphanumeric sequence. The best strategy for a machine to pass the CAPTCHA challenge is to submit three random CAPTCHAs out of all the CAPTCHAs that it has recognized as English alphanumeric sequences. If the machine has recognized fewer than three CAPTCHAs as English alphanumeric sequences, then the machine makes up the difference by selecting randomly from those not recognized as English alphanumeric sequences. Since the probability of success for each of the 12 CAPTCHAs is assumed to be independent, the expression in TABLE 1 can be used to calculate a probability of success for a selectable set of CAPTCHAs.

TABLE 1

Prob(success) = Prob(the 3 true words classified correctly AND these 3 are chosen among those classified as words) +

Prob(2 or fewer true words classified correctly AND 9 non-words classified correctly AND remaining true word(s) chosen from those classified as non-words)

$$= p^3 \left\{ p^9 + \frac{\binom{9}{1}p^8(1-p)^1}{\binom{4}{3}} + \frac{\binom{9}{2}p^7(1-p)^2}{\binom{5}{3}} + \cdots + \frac{\binom{9}{8}p^1(1-p)^8}{\binom{11}{3}} + \frac{(1-p)^9}{\binom{12}{3}} \right\} +$$

$$\frac{\binom{3}{1}p^2(1-p)^1 p^9}{\binom{10}{1}} + \frac{\binom{3}{2}p^1(1-p)^2 p^9}{\binom{11}{2}} + \frac{\binom{3}{3}p^0(1-p)^3 p^9}{\binom{12}{3}}$$

In the first term of the expression in TABLE 1, each summand counts the ways for a machine to recognize a certain number of the non-English alphanumeric sequences correctly and divides by the number of ways to choose three alphanumeric sequences out of all alphanumeric sequences deemed to be the actual English alphanumeric sequences. Using this formula, it is possible to obtain, for example, that the probability of a machine solving the selectable CAPTCHA challenge is approximately 0.015, assuming that the machine can recognize an English alphanumeric sequence with a probability of 0.6. This analysis assumes that the probability of a machine recognizing a CAPTCHA does not vary from CAPTCHA to CAPTCHA. However, it is possible to assign a different probability of a machine recognizing a CAPTCHA to each different CAPTCHA.

Displaying CAPTCHAs

CAPTCHAs can be displayed in a matrix or a sequence. Both types of display configurations can be mixed and presented in parallel or sequentially. To prevent a machine from recognizing a pattern in the matrix or the sequence, the CAPTCHAs can be displayed in random order. Other visual presentation methods are possible depending on the intended use or display. For example, the CAPTCHAs can be displayed in a ring or in the shape of a letter. The particular display pattern can be made difficult to guess or anticipate by a person or machine trying to solve the CAPTCHA challenge. The order or position of the CAPTCHAs in the display can be selected such that, with high probability, the order or position of the sets of CAPTCHAs cannot be distinguished from a random order or position by the party for whom the sets of CAPTCHAs are generated.

CAPTCHAs can also be displayed aurally. For example, the system can play an audio version of a CAPTCHA in a sequence. This display method can be important for visually impaired persons and for displays where an audio presentation is better. During this process, the system plays an audio version of the CAPTCHAs in a sequence. Aural display can include spelling out the letters of a CAPTCHA, or pronouncing words. In general, an aural display can be any sound or spoken words that can represent an image. Aural and visual displays can also be combined.

Making CAPTCHAs Selectable

Embodiments of the present invention include a process for making a set of CAPTCHAs selectable. During this process, the system makes respective CAPTCHAs in the first and second sets of displayed CAPTCHAs selectable through interfaces that can include a keyboard, mouse, pen, graphics tablet, scroll wheel, trackball, joystick, pointing stick, touchpad, button, dataglove, footmouse, touch screen, key pad, dial, switch, gesture, facial expression, eye tracking, body movement, brain interface, voice command, and/or other signaling. Various other interface devices can be used for selecting CAPTCHAs.

Figure 6:
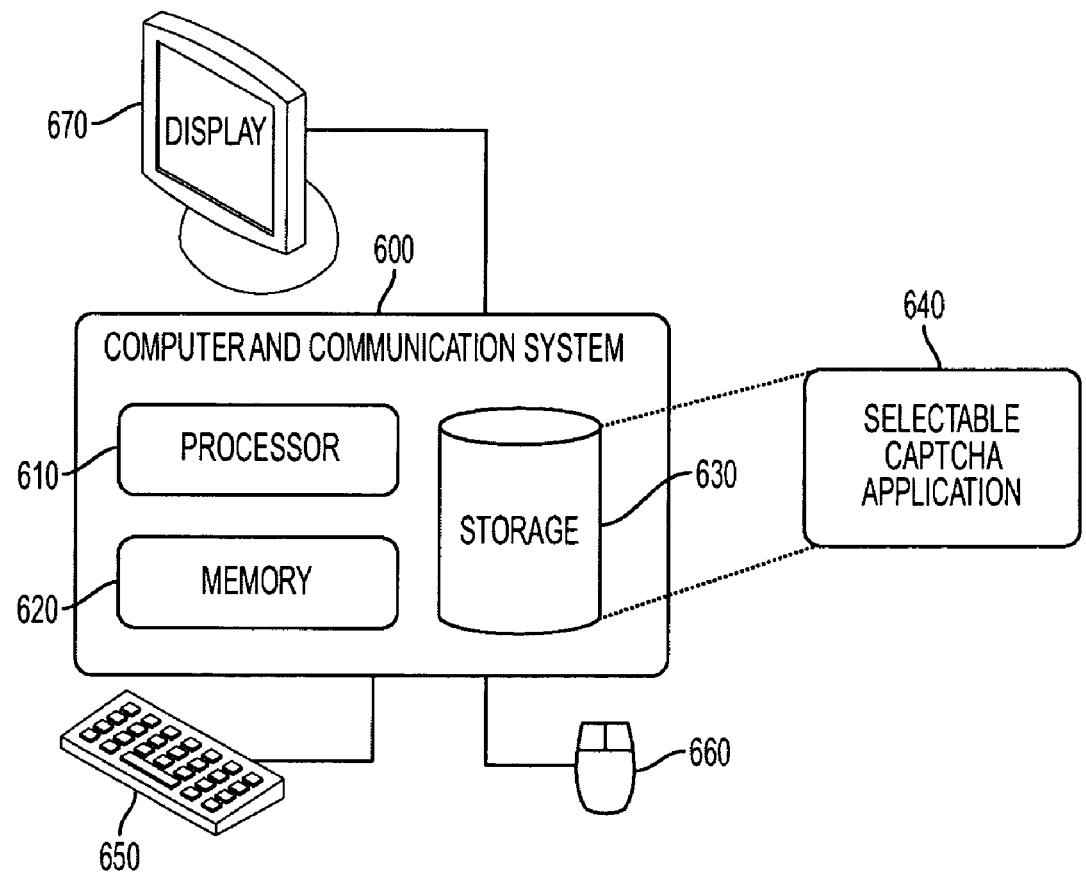
FIG. 6 presents an exemplary computer system for displaying a set of selectable CAPTCHAs in accordance with an embodiment of the present invention.

Note that the user only needs to select the CAPTCHAs without typing the contents of the CAPTCHAs to pass a CAPTCHA challenge. CAPTCHA Computer and Communication System FIG. 6 presents an exemplary computer system for displaying a set of selectable CAPTCHAs in accordance with an embodiment of the present invention. In FIG. 6, a computer and communication system 600 includes a processor 610, a memory 620, and a storage device 630. Storage device 630 stores programs to be executed by processor 610. Specifically, storage device 630 stores selectable CAPTCHA application 640. During operation, selectable CAPTCHA application 640 is loaded from storage device 630 into memory 620 and is executed by processor 610. In this example, a keyboard 650 and a pointing device 660 are used to select selectable CAPTCHAs, which are displayed on display 670. Various other selection and display devices can be used.

CONCLUSION

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
   producing, by a computer, a first set of Completely Automated Public Turing test to tell Computers and Humans Apart (CAPTCHAs) whose images are based partially on an alphanumeric sequence, wherein each CAPTCHA in the first set has a common value for a CAPTCHA property, wherein the common value for the CAPTCHA property associated with a linguistic characteristic of the alphanumeric sequence;
   producing, by the computer, a second set of CAPTCHAs whose images are based partially on an alphanumeric sequence, wherein none of the CAPTCHAs in the second set has the common value for the CAPTCHA property shared by the CAPTCHAs in the first set;
   displaying, by the computer, the first set of CAPTCHAs and the second set of CAPTCHAs; and
   determining whether a user passes a CAPTCHA challenge to distinguish the first set of CAPTCHAs from the second set of CAPTCHAs based on a user selection of all the CAPTCHAs belonging to either the first set of CAPTCHAs or the second set of CAPTCHAs from the displayed CAPTCHAs,
   wherein the CAPTCHA challenge is associated with a required skill set such that:
   a person with the required skill set passes the CAPTCHA challenge;
   a person without the required skill set does not pass the CAPTCHA challenge; and
   an automated tool does not acquire the required skill set.

2. The method of claim 1, wherein producing the first set of CAPTCHAs comprises:
   identifying the CAPTCHA property;
   identifying a set of CAPTCHAs associated with the CAPTCHA property; and
   returning the set of identified CAPTCHAs.

3. The method of claim 1, wherein the CAPTCHA property comprises one or more properties associated with the alphanumeric sequence on which the CAPTCHA is based.

4. The method of claim 1, wherein the number of CAPTCHAs produced in the first set and the number of CAPTCHAs produced in the second set are based on one or more of:
   desired CAPTCHA strength;
   probability of a machine recognizing a CAPTCHA; and
   one or more display characteristics.

5. The method of claim 1, wherein displaying the first and second sets of CAPTCHAs comprises:
   displaying respective CAPTCHAs in the first and second sets of CAPTCHAs in a matrix; or
   displaying respective CAPTCHAs in the first and second sets of CAPTCHAs in a sequence.

6. The method of claim 1, wherein displaying the first and second sets of CAPTCHAs comprises playing an audio version of respective CAPTCHAs in the first and second sets of CAPTCHAs in a sequence.

7. The method of claim 1, wherein the user selection of the CAPTCHAs is received via one or more of:
   keyboard;
   mouse;
   pen;
   graphics tablet;

scroll wheel;
trackball;
joystick;
pointing stick;
touch pad;
button;
dataglove;
footmouse;
touch screen;
key pad;
dial;
switch; and
an interface for detecting one or more of: gesture, facial expression, eye movement, body movement, brain activity, and voice command.

8. An apparatus comprising:
a processor;
a memory coupled to the processor, the memory storing a program instructions, said instructions when executed by the processor causes the processor to perform the steps of:
producing a first set of CAPTCHAs whose images are based partially on an alphanumeric sequence, wherein each CAPTCHA in the first set has a common value for a CAPTCHA property, wherein the common value for the CAPTCHA property associated with a linguistic characteristic of the alphanumeric sequence;
producing a second set of CAPTCHAs whose images are based partially on an alphanumeric sequence, wherein none of the CAPTCHAs in the second set has the common value for the CAPTCHA property shared by the CAPTCHAs in the first set;
displaying the first set of CAPTCHAs and the second set CAPTCHAs; and
determining whether a user passes a CAPTCHA challenge to distinguish the first set of CAPTCHAs from the second set of CAPTCHAs based on a user selection of all the CAPTCHAs belonging to either the first set of CAPTCHAs or the second set of CAPTCHAs from the displayed CAPTCHAs,
wherein the CAPTCHA challenge is associated with a required skill set such that:
a person with the required skill set passes the CAPTCHA challenge;
a person without the required skill set does not pass the CAPTCHA challenge; and
an automated tool does not acquire the required skill set.

9. The apparatus of claim 8, wherein while producing the first set of CAPTCHAs, the first production mechanism is further configured to:
identify the CAPTCHA property;
identify a set of CAPTCHAs associated with the CAPTCHA property; and
return the set of identified CAPTCHAs.

10. The apparatus of claim 8, wherein the CAPTCHA property comprises one or more properties associated with the alphanumeric sequence on which the CAPTCHA is based.

11. The apparatus of claim 8, wherein the number of CAPTCHAs produced in the first set and the number of CAPTCHAs produced in the second set are based on one or more of:
desired CAPTCHA strength;
probability of a machine recognizing a CAPTCHA; and
one or more display characteristics.

12. The apparatus of claim 8, wherein while displaying the first and second sets of produced CAPTCHAs, the display mechanism is further configured to:
display respective CAPTCHAs in the first and second sets of CAPTCHAs in a matrix; or
display respective CAPTCHAs in the first and second sets of CAPTCHAs in a sequence.

13. The apparatus of claim 8, wherein while displaying the first and second sets of produced CAPTCHAs, the display mechanism is further configured to play an audio version of respective CAPTCHAs in the first and second sets of CAPTCHAs in a sequence.

14. The apparatus of claim 8, wherein the user selection of the CAPTCHAs is received by the receiving mechanism via one or more of:
keyboard;
mouse;
pen;
graphics tablet;
scroll wheel;
trackball;
joystick;
pointing stick;
touch pad;
button;
dataglove;
footmouse;
touch screen;
key pad;
dial;
switch; and
an interface for detecting one or more of: gesture, facial expression, eye movement, body movement, brain activity, and voice command.

15. A non-transitory computer-readable storage medium having computer-executable storing when executed by a computer cause the computer to perform a method comprising:
producing, by a computer, a first set of CAPTCHAs whose images are based partially on an alphanumeric sequence, wherein each CAPTCHA in the first set has a common value for a CAPTCHA property, wherein the common value for the CAPTCHA property associated with a linguistic characteristic of the alphanumeric sequence;
producing, by the computer, a second set of CAPTCHAs whose images are based partially on an alphanumeric sequence, wherein none of the CAPTCHAs in the second set has the common value for the CAPTCHA property shared by the CAPTCHAs in the first set;
displaying, by the computer, the first set of CAPTCHAs and the second set of CAPTCHAs; and
determining whether a user passes a CAPTCHA challenge to distinguish the first set of CAPTCHAs from the second set of CAPTCHAs based on a user selection of all the CAPTCHAs belonging to either the first set of CAPTCHAs or the second set of CAPTCHAs from the displayed CAPTCHAs,
wherein the CAPTCHA challenge is associated with a required skill set such that:
a person with the required skill set passes the CAPTCHA challenge;
a person without the required skill set does not pass the CAPTCHA challenge; and
an automated tool does not acquire the required skill set.

16. The non-transitory storage medium of claim 15, wherein producing the first set of CAPTCHAs comprises:
- identifying the CAPTCHA property;
- identifying a set of CAPTCHAs associated with the CAPTCHA property; and
- returning the set of identified CAPTCHAs.

17. The non-transitory storage medium of claim 15, wherein the CAPTCHA property comprises one or more properties associated with the alphanumeric sequence on which the CAPTCHA is based.

18. The non-transitory storage medium of claim 15, wherein the number of CAPTCHAs produced in the first set and the number of CAPTCHAs produced in the second set are based on one or more of:
- desired CAPTCHA strength;
- probability of a machine recognizing a CAPTCHA; and
- one or more display characteristics.

19. The non-transitory storage medium of claim 15, wherein displaying the first and second sets of CAPTCHAs comprises:
- displaying respective CAPTCHAs in the first and second sets of CAPTCHAs in a matrix; or
- displaying respective CAPTCHAs in the first and second sets of CAPTCHAs in a sequence.

20. The non-transitory storage medium of claim 15, wherein displaying the first and second sets of CAPTCHAs comprises playing an audio version of respective CAPTCHAs in the first and second sets of CAPTCHAs in a sequence.

21. The non-transitory storage medium of claim 15, wherein the user selection of the CAPTCHAs is received via one or more of:
- keyboard;
- mouse;
- pen;
- graphics tablet;
- scroll wheel;
- trackball;
- joystick;
- pointing stick;
- touch pad;
- button;
- dataglove;
- footmouse;
- touch screen;
- key pad;
- dial;
- switch;
- and
- an interface for detecting one or more of: gesture, facial expression, eye movement, body movement, brain activity, and voice command.

* * * * *